Feb. 27, 1962     M. J. KIDDER     3,022,734
SHOT SHELL WAD

Filed July 27, 1959     2 Sheets-Sheet 1

*INVENTOR.*
MARSHALL J. KIDDER
BY John H. Lewis Jr.
ATTORNEY

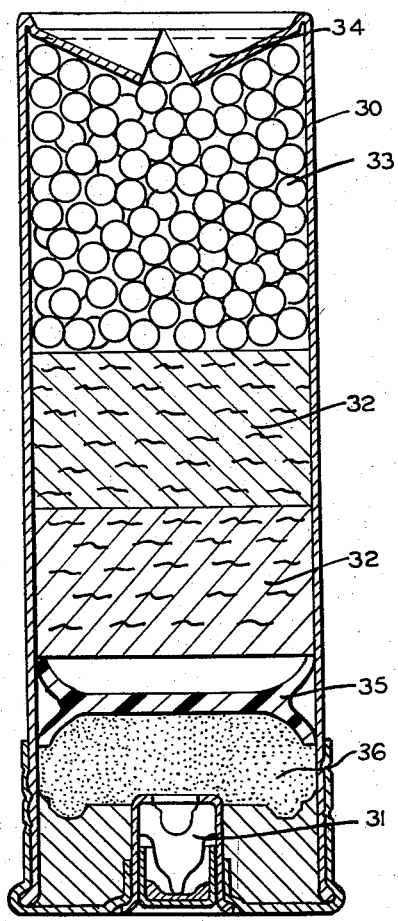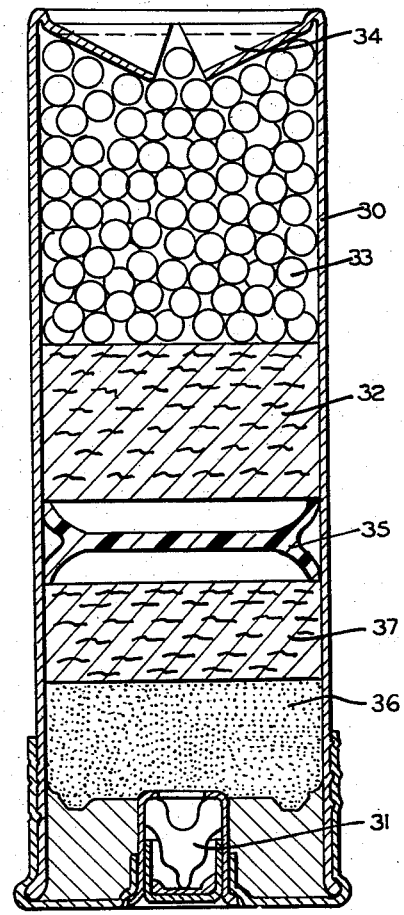

United States Patent Office 3,022,734
Patented Feb. 27, 1962

3,022,734
SHOT SHELL WAD
Marshall J. Kidder, Fairfield, Conn., assignor to Remington Arms Company, Inc., Bridgeport, Conn., a corporation of Delaware
Filed July 27, 1959, Ser. No. 829,780
2 Claims. (Cl. 102—95)

This invention relates to a wad for shot shells, and particularly to such a wad as may be formed by the extrusion of suitable plastic materials at room temperature.

This application is a continuation-in-part of my application Serial Number 700,394, filed December 3, 1957, now abandoned.

In the drawings:

FIGS. 5 and 6 are longitudinal sectional views taken through shot shells loaded with wads produced in accordance with my invention.

Shot shell wads are ordinarily made either by cutting disks from a flat sheet or by the molding of moldable materials such as the synthetic thermoplastics and admixtures of granular and/or fibrous materials with a flowable binder. According to the prior art, the plastic or the binder has been made flowable either by heating or by the use of a plasticizer or a fluid which is expelled in the process of molding and/or subsequently evaporated. If the material is thermoplastic, it must be preheated to a temperature adequate to enable it to conform to the configuration of the mold and must remain in a relatively cold mold for a time sufficient to rigidify the product to such an extent that it can withstand handling on its removal from the mold without permanent distortion.

The present invention contemplates extruding plastic materials at room temperature and enables the rapid production of formed wads without pre-heating and without a delay in the mold during which the temperature is reduced to rigidify the product and without any curing or other process subsequent to ejecting the wads from the mold.

Suitable materials are the synthetic polymers, usually of the thermoplastic type. Thermoplastic elastomers, such as polyethylene, styrene butadiene copolymer, styrene butadiene acrylonitrile, cellulose acetate and ethyl cellulose, are preferred, although the invention is not limited to any particular plastic.

Figure 3:
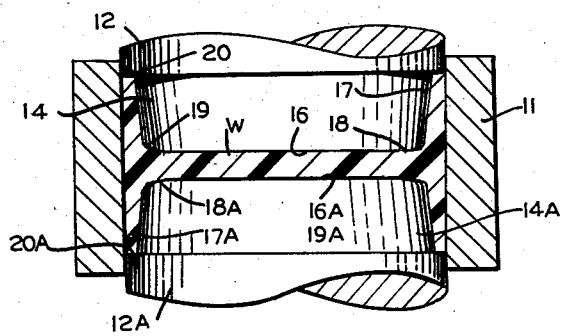
FIG. 3 is a fragmentary enlarged sectional elevation of the die in closed position, with a formed wad therein.

By way of illustration, the invention will be described as applied to the manufacture of a wad which is symmetrical with respect to a medial plane parallel to the web faces. In section, the mold is of H configuration (FIG. 3 shows the mold with the wad in the process of being formed), while the section of the product (FIG. 4) may roughly be described as a double Y or an H with a centrally disposed cusp in the flange thereof.

In process, a disk-shaped blank B is prepared, usually by cutting from a flat sheet, the diameter of the blank being somewhat greater than the desired diameter of the finished wad and the thickness of the blank being substantially greater than the thickness desired for the web of the finished wad. Such a blank is inserted in a cylindrical die 11, the diameter of the die preferably being such as to frictionally hold the blank centered with respect to punches 12 and 12a which are arranged for reverse reciprocation relative to die 11. As illustrated, the punches are of identical configuration, with a view to producing wads which can be used either side up instead of requiring orientation prior to insertion into a shot shell body. The nose portion 14 of each punch is of reduced diameter, defining an annular cavity 15 of a width which determines the average thickness of the wad flange or skirt S. The mid-portion of the end face 16 of each punch is disposed substantially at right angles to the punch axis and is joined to the peripheral surface 17 by a slightly inclined annulus 18 and a radius 19. The peripheral surface 17 is preferably tapered somewhat, say at an angle of about 5°, this taper controlling the taper of the wad skirt in a manner to be described.

Prior to insertion in the die, the slugs are lubricated with a soap, preferably one which is about 95% anhydrous and does not contain more than about .05% free alkali. The soap may conveniently be applied by immersing the blanks in a 1% to 2% solution of the soap at a temperature of about 130°–140° F., for a brief time, then removed and dried, preferably with tumbling, to obviate adhesion. The soap lubrication has been found quite important to successful extrusion in that it improves the definition and uniformity in shape and improves dimensional control of the wad without interfering with the strength of the resulting wad as some other lubricants have been found to do.

The wad blank B being in place in the die, the two punches are advanced to engage the blank and extrude a part of the material thereof into the annular cavity.

To secure useful wads, it has been found essential that the two punches advance at substantially the same rates. If one of the punches is stationary, or moves more slowly than the other, the result is a misshapen and distorted wad, probably as a result of the non-uniform degree of cold work to which the opposite faces of the blank are subjected. The skirt S on the side of the wad adjacent the more rapidly moving punch is longer than the skirt on the opposite side and tends to be irregular, and the web W of the wad is concave in the direction of the more rapidly moving punch. Upon being subjected to the pressure of two punches advancing at substantially the same rates, the plastic between the mid-portions 16 of the punches is contacted first and flows radially outwardly and then the inclined annulus 18 begins to do work on the blank after which the plastic flows generally axially around the radius 19 to fill the cavity between the die wall, and the peripheral surface 17 defining the nose of the punch tip.

Figure 1:
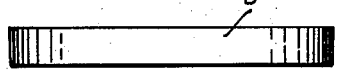
FIG. 1 is a fragmentary enlarged elevation of a disk-like blank from which a formed wad is to be extruded.
Figure 4:
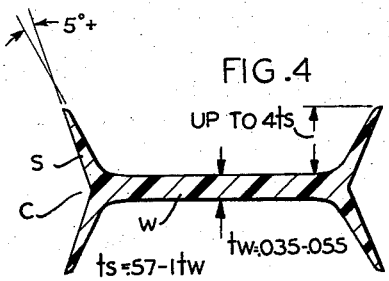
FIG. 4 is an enlarged sectional elevation of one type of formed wad.
Figure 2:
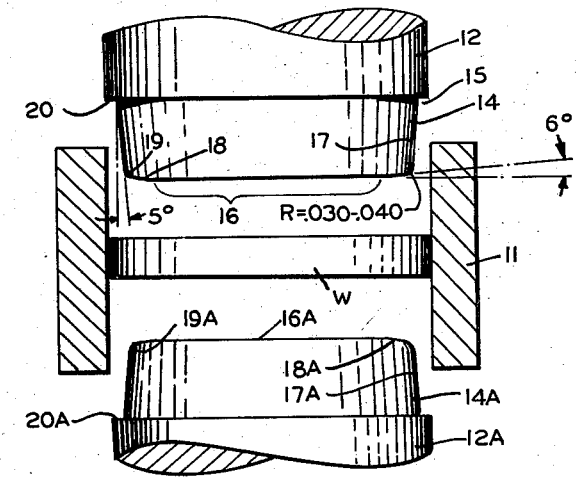
FIG. 2 is a fragmentary enlarged sectional elevation of the open die in which the blank of FIG. 1 is placed for the purpose of extrusion.

The results of first closing the die with a blank B in place and then opening the die are unique, and the mechanism of the displacement of the plastic perhaps not fully understood. The resulting wad is shown in FIG. 4. What is believed to be the configuration of the plastic when the die is fully closed, with the punches at their point of maximum advance, is shown in FIG. 3. The plastic substantially completely fills the cavity bounded by the cylindrical die, the reduced diameter punch tips 14 and the space between the punch faces 16. The thickness of the web W of the finished wad is approximately one-half the thickness of the blank B. It is impracticable to ascertain the space between the faces 16 of the two punches at the point of their maximum advance, but it appears that this spacing is less than the web thickness, for the following reasons:

The periphery of the wad after removal from the die, instead of being cylindrical, comprises an annular cusp C of substantially V-shape, the skirts S being inclined outwardly from the web W. There is little, if any, cylindrical surface at the tips of said cusp. The ends of the skirts S may comprise a flat annulus, but the width of this annulus is less than the width of the punch shoulders 20, and the annulus merges with the interior of the skirt wall in a curve as shown in FIG. 4. Considering any radial section of the wad, the two walls defining the inclined skirts relatively diverge from their free ends toward the web in an angle which corresponds generally to but tends to be somewhat greater than the angle of 5° between the periphery 17 of the punch tips and the cylindrical wall of the die. The resulting taper contributes to column stiffness in any increment of the skirt and helps to avoid buckling under load. The fillet corresponding to the radius 19 on the punches and the annular zone corresponding to the inclined annulus 18 on the punches are less sharply defined and of smaller radius than the corresponding portions of the punches.

The outside diameter of the wad as measured across the open ends of the skirts is somewhat less than the diameter of the die, and the depth of the skirts tends to be somewhat less than the height of the punch tips 14. For example, if the die diameter is .770", the wad diameter will be .760" or .755"; and if the die diameter is .720", the wad diameter will be .710" to .705". It may be theorized that, as the punches engage and progressively deform the blank, the outward flow of the plastic stock is resisted by a radial stress within the part of the stock remaining between the punch faces and that this stress is of such magnitude that when the punches are withdrawn from the blank a considerable elastic recovery occurs, some of the material displaced from the web returning thereto. Residual radial stress is indicated by the fact that the wads cling tightly to the punches and considerable force is required to dislodge them. The residual stress being radial, and the part of the stock which was first subjected to plastic flow and therefore has been placed under the greatest stress being in the plane of the web, the maximum elastic recovery is radial and in the plane of the web, and the result is the peripheral cusp C.

That central part of the web which is first subjected to the force of the punches appears to have been substantially modified in terms of density, stiffness, molecular orientation, and/or increased ratio of crystalline to amorphous material when compared to the material of the starting blank and the degree of modification becomes progressively less between the web and the edges of the skirts. Density determinations made by floating wad segments in water-alcohol solutions of controlled proportions show conclusively, for example, that the central web of the wad is most dense and that portions of the periphery of the skirt and the starting blank material are progressively, and respectively less dense.

The increased density in the web of the wad and the improved physical properties in consequence of the progressive working between the end of the punches result in a thinner, lighter wad being able to safely contain the pressures to which it is subjected on firing. The lighter the wad, of course, the lighter the recoil of the gun for comparable ballistics imparted to the shot charge.

That the cusp C is produced by elastic recovery, and not by a separation of the stock at the periphery of the blank, is further shown as follows:

An annular groove in the wall of die 11 opposite the blank results in an annular bead in the bottom of the cusp, the dimensions of the bead being comparable to the dimensions of the groove. Such a groove elsewhere in the die periphery results in a bead on the skirt wall which tends to be of lesser dimensions than the dimensions of the groove. A line such as a pencil mark on the periphery of the blank extending between the faces shows on the periphery of the finished wad (FIG. 4) as a continuous mark extending transversely through the cusp. However, if the punch noses 14 are lengthened to such an extent that the depth of each annular cavity 15 is more than about four times its width, thus permitting the material forming the skirt of the wad to flow axially by more than that amount, a continuous mark on the periphery of the blank will on the skirts of the wad show a discontinuity in the region of the bottom of the cusp C and the wad will tend to split or laminate in this region. Accordingly, the punches should be so proportioned that the length of the wad skirt may not exceed about four times the average thickness of such skirt.

Considering by way of example a wad for a 12 gauge shot shell, the thickness of the blank B is from .087" to .096", preferably about .090"; and the thickness ($tw$) of the central planar portion of the web of the finished wad (FIG. 4) is between limits of about .035" and about .055", a thickness of about .045" being preferred. Wads with thicker webs frequently break on firing under adverse conditions, and wads with thinner webs distort on being removed from the die, may rupture on firing, and may not have adequate stiffness to support the skirts as they are forced outwardly into sealing contact with the interior of the shot shell body and subsequently the gun barrel. These measurements are taken not less than about thirty minutes after the wad has been removed from the die, during which interval the web thickness increases some .002" or .003" over its thickness when first withdrawn from the die. Thereafter, the wad is substantially dimensionally stable. This web thickness is materially less than the web thickness required for wads which are hot molded from the same material as the starting blank used for this invention. If a hot molded wad is made with a web of a thickness comparable with the web thickness of the extruded wad of this invention, the web is ruptured on firing at elevated temperatures—for example, 135° F. The outside diameter of the wad as stabilized is somewhat less (for example, .015") than the diameter of the die 11, as above noted.

The thickness of the skirt S, measured at the point of maximum thickness, exclusive of the fillet joining skirt to web, may vary from the thickness of the web down to about 57% of the thickness of the web. Outside of these proportions the wad is distorted and useless or, if thinner, the skirt may lack the strength necessary to support itself against buckling in use. The length L of skirt S should not exceed four times the skirt thickness, otherwise the web tends to split, as above noted, and/or buckle when subjected to stress in firing. The radius R of that portion of the punch defining the junction between the web and skirt is between .030" and .040"—a lesser radius produces break-ups on firing—a greater radius increases extrusion difficulty, produces wavy skirt ends and a tendency of the wad material to laminate. After the wad has been removed from the punches and elastic recovery of the web has taken place, the radius of the fillet on the wad is difficult to measure but is substantially greater than .040".

The included angle formed between the two opposed wad skirts may vary between about 75 degrees and about 150 degrees. 90 degrees to about 110 degrees is near an optimum value for this included angle. If such a wad be examined when compressed between two opposed parallel faces confined in a bore in a transparent cylinder, it will be noted that a component of the compressing force tends to radially expand the edge of each skirt of the wad into an annular line engagement with the cylindrical surrounding surface. If the included angle between the skirts is as great as 180 degrees, the radial component of the compressing force will be zero, and the only forces tending to expand the wad into sealing contact will be that of upsetting the skirt due to axial compression. As the included angle approaches zero, the component of force causing radial expansion increases relative to the compressing force but greater stiffness is required in the web to resist this force and in the skirt to avoid buckling under load. The center of the range or the high side of 90 degrees is desirable for, in this range, increases in the axial compressing force are directly proportional to radial expanding forces in a near 1-to-1 ratio.

The sealing effectiveness of a wad when loaded into a shot shell has been shown to be predominantly the result of the radial expansion of the skirts of the wad when axially compressed against a resistant surface and sealing effectiveness is to only a minor degree dependent on the pump leather effect of gas pressure acting inside a skirted wad.

Referring particularly to FIG. 5, there is shown a shot shell with the wad 35 identical with that of FIG. 4 loaded in direct engagement with a powder charge 36. In this shell there are loaded over the wad 35 two filler wads 32 which may be of an edge lubricated felted fibrous material as is conventional. The shell is completed by the usual shot charge 33 and the shell body 30 may preferably be closed with a closure of the type shown in the patent to Meadows, U.S. No. 929,866, Finlay U.S. No. 2,242,907, or other similar arrangement characterized by abutting segments and folds and by the absence of any top wad or other element capable of interfering with the travel of the shot charge. Such a shell is ordinarily loaded under some degree of compression and the yieldability of the subject wad under axial force contributes to maintaining tightness in the shot and wad column while applying a sufficient degree of radial expansion to produce an initially good gas seal. When such a shell is fired the application of pressure to the web of the wad forces it forward toward the filler wad and radially expands the forward skirt into gas tight engagement with the wall of the body 30. At the same time, gas pressure within the rearward skirt tends to expand it by "pump leather" action into sealing contact. That the most effective sealing comes from engagement of the forward skirt against the filler wad has been demonstrated by tests of such wads with one skirt removed. When the remaining skirt is loaded against the filler wad gas sealing as demonstrated by high speed flash pictures of emerging shot charges is not substantially different than with an unmutilated wad. If, however, the wad is loaded with the remaining skirt against the powder charge so that only gas pressure is acting to produce a gas seal, it will be found that the gas sealing effectiveness is substantially reduced below the level of sealing effectiveness reached with either an unmutilated wad or one with only its rearward skirt removed.

When the wad of this invention is sandwiched between two filler wads such as the wads 32 and 37 in FIG. 6, its sealing efficiency is equal or better than when loaded as an overpowder wad as shown in FIG. 5. In this arrangement the overpowder wad 37 is preferably impregnated with a waxlike lubricant to render it gas impervious as taught in Finlay's U.S. Patent No. 2,462,312. When a shell with this wad column is fired, the wad of this invention is compressed between the two fibrous wads and the edge of each skirt is brought into intimate sealing contact with the wall of the shot shell body, this engagement being maintained as the wad column forces the shot before it through the bore of the gun. With either arrangement of the wad column, the wad which is the subject of this invention engages the bore of the gun barrel on two thin annular lines and under high localized pressure resulting in an unusually effective sealing action.

The outside diameter of the sealing wad of this invention is of considerable significance. If the diameter of such a wad is more than about .040" greater than the inside diameter of the shot shell body, there will be such a degree of interference as to make it difficult to insert the wad into the shell even when fed to the shell through a tapered breakdown bushing. Also, a wad which makes such an interference fit produces an exceptionally effective gas seal and with its high localized pressure tends to scrape off of the surface of the bore the lubricant deposited by the edge lubrication on the filler wad. If the lubricant is thus removed there will be no lubrication for the passage of the next charge of shot through the barrel and there will be a high degree of abrasion of the shot charge against the wall of the barrel with resultant "leading" or pickup of lead on the walls of the barrel.

Nominally, a 12 gauge shotgun has a bore diameter between .729" and .734", and the body of the shotshell has an inside diameter between .710" and .715". A wad made in accordance with this invention of .755" outside diameter can be loaded into production shot shells, although with some difficulty. Such a wad produces substantially perfect gas sealing but in doing so, it so effectively removes the lubricant deposited by the filler wads that the next fired shot charge passes through an unlubricated barrel and leading performance is not acceptable. On the other hand, such a wad having an outside diameter of .705" loads easily and gives excellent leading performance but relatively inefficient gas sealing. The best compromise comes with a wad diameter which is substantially bore diameter or perhaps slightly less than bore diameter. By "substantially bore diameter" is meant a diameter which is not more than actual bore diameter and preferably not more than .010" less than the bore diameter of the barrel in which it is to be used with realization that lesser diameters can be used with moderate sacrifice in gas sealing efficiency.

Shooting tests on wads made according to the present invention in comparison with hot molded wads of the same material show the extruded wads to be definitely superior. Material, wad diameter, etc., being identical, the leading deposited in the barrel when the extruded wad is used as compared to that deposited when a hot molded wad is used being about equal. Excellent gas sealing can be secured, particularly if the wads are made substantially of bore diameter.

What is claimed is:

1. A synthetic thermoplastic elastomer shot shell wad having a central transversely extending imperforate planar circular web and circumferentially continuous, opposed frusto-conical skirts each joined at its end of least diameter to said web and extending forwardly and rearwardly from the outer circumference of said circular web, the included interior angle between any segment of said skirt and said web being an angle of greater than 90°, said web having a thickness between limits of about .035" and about .055", and said skirts having a maximum thickness between limits of about .57 and about 1 times the thickness of said web exclusive of any thicker portion which may be formed at the junction of said skirts with said web, said skirts having a thicker portion immediately adjacent said transversely extending web and tapering uniformly to a minimum thickness at their outer peripheral edges, the taper of said skirts being defined by an included angle of between about 5° and about 10°, the length of said skirts being not over about four times the thickness of said skirts immediately adjacent any localized thickness increase at the junction of said skirts with the transverse web, in which the weight per unit volume of the synthetic elastomeric material of which said wad is composed is greater in the central transversely extending web portion than it is in the skirt portions.

2. A shot shell wad according to claim 1, in which the percentage of crystalline material rather than amorphous material is higher in the central transversely extending web portion of the wad than it is in the skirt portions.

References Cited in the file of this patent

UNITED STATES PATENTS

| 2,920,563 | De Caro | Jan. 12, 1960 |

FOREIGN PATENTS

| 522,218 | France | Mar. 23, 1921 |
| 928,104 | France | May 26, 1947 |
| 438,808 | Italy | Aug. 27, 1948 |